United States Patent [19]

Kreft et al.

[11] Patent Number: 4,928,087
[45] Date of Patent: May 22, 1990

[54] PHASE-STABILIZED, PHASE-COUPLED RESONANT CIRCUIT

[75] Inventors: Hans-Diedrich Kreft, Dassendorf; Holger MacKenthun; Wolfgang Hass, both of Hamburg, all of Fed. Rep. of Germany

[73] Assignee: Angewandte Digital Electronik GmbH, Fed. Rep. of Germany

[21] Appl. No.: 329,309

[22] Filed: Mar. 27, 1989

[51] Int. Cl.[5] .................... H03B 19/00; G06K 19/06; H04Q 7/00

[52] U.S. Cl. .......................... 340/825.71; 340/825.54; 340/870.25; 340/870.31; 235/449; 235/492; 235/493

[58] Field of Search ...................... 340/825.54, 825.71, 340/870.25, 870.31; 324/225, 226, 233; 235/449, 450, 474, 487, 492, 493

[56] References Cited

U.S. PATENT DOCUMENTS 4,697,183 9/1987 Jenning et al. ................. 340/870.25
4,814,595 3/1989 Gilboa ................................. 235/492
4,857,893 8/1989 Carroll ............................ 340/825.54

FOREIGN PATENT DOCUMENTS

2165423 4/1986 United Kingdom ........... 340/825.54

Primary Examiner—Donald J. Yusko
Assistant Examiner—Dervis Magistre
Attorney, Agent, or Firm—Hill, Van Santen, Steadman & Simpson

[57] ABSTRACT

In a system having a mobile part and an immobile part between which data and energy are transmitted, an electronic control for two resonant circuits serve the purpose of transmitting energy to the mobile part. The resonant circuits are driven so that their oscillations have a prescribed phase shift relative to one another. For data transmission to the mobile part, a phase shift is superimposed on the transmitted signal at one resonant circuit. On the basis of the phase relation of the signals relative to one another, the mobile part can identify which resonant circuit is transmitting the data. The oscillation of the resonant circuit that is transmitting new data via the phase shift is used for the formation of the clock signal on the part of the mobile part.

1 Claim, 7 Drawing Sheets

FIG. 2  FUNDAMENTAL STRUCTURE OF THE CONTROL CIRCUIT OSCILLATOR

WIRING FOR S1,T1

WIRING FOR S2,T2

PHASE-STABILIZED, PHASE-COUPLED RESONANT CIRCUIT

BACKGROUND OF THE INVENTION

1. Field of the Invention

The present invention is directed generally to an energy and data transmission system operating without contact and being composed of a microstation and a microunit.

2. Description of the Related Art

Data carriers and data equipment in the form of, for example, chip cards having integrated electronic components, are utilized in a great variety of applications. In almost all such systems that are commercially available, contacts are provided between the card and the reader means. Such contacts are disadvantageous since they are subject to contamination, static discharges, vibrations and wear.

These disadvantages do not occur in a contact-free system that operates inductively.

When energy and data signals are transmitted in a non-contacting fashion, it is obvious to employ a transmission frequency that the microunit can use as a clock signal for operating electronic circuit assemblies in the microunit, the clock signals being either identical to the transmission frequency or directly acquired therefrom by subdividing. Moreover, the frequency employed should satisfy international guidelines or potential standards. The frequency employed thus must be held constant. Due, however, to aging and to component tolerances, the component parts that are used in the resonant circuit for generating the transmission oscillation frequency are altered so that the natural frequency of the resonant circuit no longer agrees with the control frequency when component part parameters are altered in such fashion. As a result, the energy transmission between the microstation and the microunit is diminished. A further condition is that two resonant circuits must have a constant phase relation relative to one another for unambiguous signal recognition by the microunit. The foregoing problem is essentially combined in the demand.

SUMMARY OF THE INVENTION

In the present invention, at a prescribed, invariable impressed (i.e. controlled) frequency, a resonant circuit electronics is optimized during operation in control engineering terms so that the natural frequency is optimized according to the control frequency even with component tolerances and different environmental influences. This is achieved in that the resonant capacitance connected parallel to a parallel resonant circuit is controlled with the assistance of capacitor diodes. It is also to be taken into consideration that the diodes are used within their operating range that is pre-controlled in terms of voltage.

These advantages are realized in an invention characterized by the following features:

1. A microunit is an autonomous electronic unit (for example, a microcomputer system) that can be operated contact-free at a microstation provided therefor.
2. The microunit does not require its own oscillator for operation in the microstation since the processing clock is acquired from the energy transmission of the microstation.
3. The microstation as well as the microunit are designed so that operation of the system is assured regardless of the position of the microunit in the receptacle means of the microstation taking mechanical fit into consideration.
4. Energy transmission and bidirectional data transmission between the microstation and microunit occur contact-free in accordance with the phase shift method as disclosed, in German Patent Application No. 34 47 560.5 and corresponding U.S. Pat. No. 4,697,183, incorporated herein by reference, and in accordance with the synchronous switch principle.
5. A driver stage in the microstation required for the inductive energy coupling is operated with a control system that allows a simple fabrication of the microstation and reduces all critical influences of inductive transmission.
6. Simultaneously with its electrical function according to claim 1, the microunit is also equipped with a magnetic strip and works as a magnetic card without disturbing the reading of the magnetic strip or the inductive non-contacting signal transmission. A plurality of parameters must be observed for reliable functioning and formatting of an inductive energy and data transmission system. This demand derives from the physical foundations since location, space and direction are always taken into consideration for a magnetic field that is used as a transformation medium.

DESCRIPTION OF THE PREFERRED EMBODIMENTS

The following description sets forth a method and apparatus with which it is possible to eliminate all problems occurring in an inductive transmission system. The inductive transmission system according to the present invention may be divided into the following areas:
energy transmission,
control circuit,
magnetic strip compatibility,
data transmission,
attitude variance, and
clock generating.

Each of these areas will be addressed individually.

Energy Transmission

Energy transmission from the microstation or a card reader to the microunit or card, occurs inductively via two coils (shown in FIG. 1) in a frequency range that lies on the order of magnitude of the required system clock for the microunit since the system clock for the microunit, for example a microcomputer, is directly derived from the transmission frequency so that no oscillator is required in the microunit.

Figures 1A, 1B:
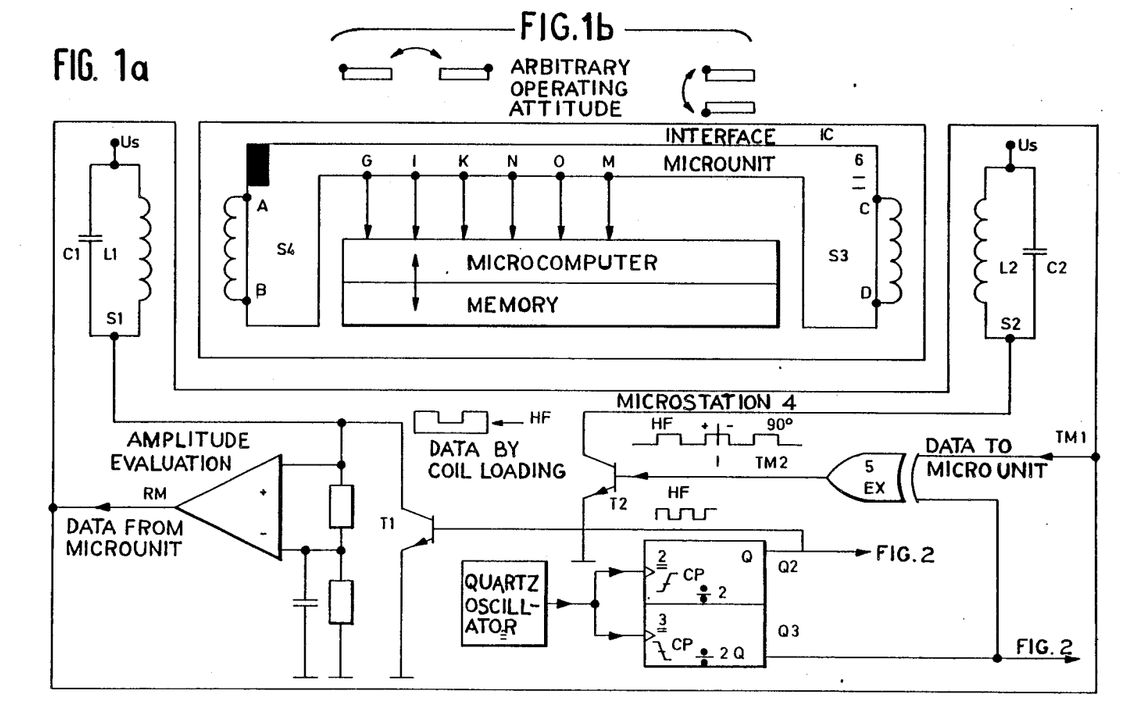
FIG. 1a is a schematic diagram of a microunit or chip card in a microstation or card reader.
FIG. 1b are schematic representations of the four different positions in which the microunit or chip card can be inserted into the microstation.

In FIG. 1, the energy processing ensues in two frequency coupled resonant circuits, T1 and S1, and T2 and S2 at a frequency of, for example, 6 MHz. Ferrite core coils L1 and L2 of the resonant circuits S1 and S2 contain an air gap into which the inductive planar coils S3 and S4 of the microunit are introduced. A magnetic flux is thus perpendicular to the planar coils. The two resonant circuits S1 and S2 operate with a controlled phase shift of +/−90 relative to one another.

The use of resonant circuits S1 and S2 has the advantage that relatively little energy outlay is required for operating the system when these operate in highly selective fashion and resonance set-ups, i.e., in the proximity of the their natural resonance.

In a simple formatting, external influences, component variations, and different microunits lead to the circuits S1 and S2 being detuned. As a result of this detuning, little energy is provided for the microunit and the required 90 degree phase shift between the circuits S1 and S2 is not established.

These deficiencies which could lead to malfunctions are eliminated in that every circuit S1 and S2 is constructed in an autonomous control circuit of identical frequency.

Control Circuit

Figure 2:
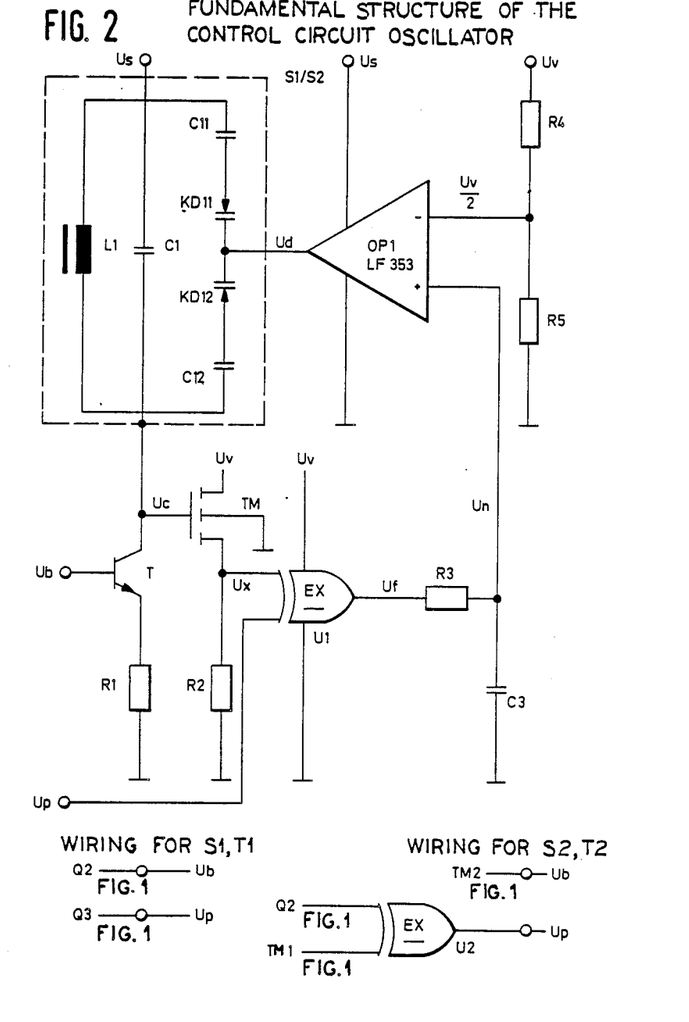
FIG. 2 is a circuit diagram of the fundamental structure of the control circuit for the present invention.
Figure 3:
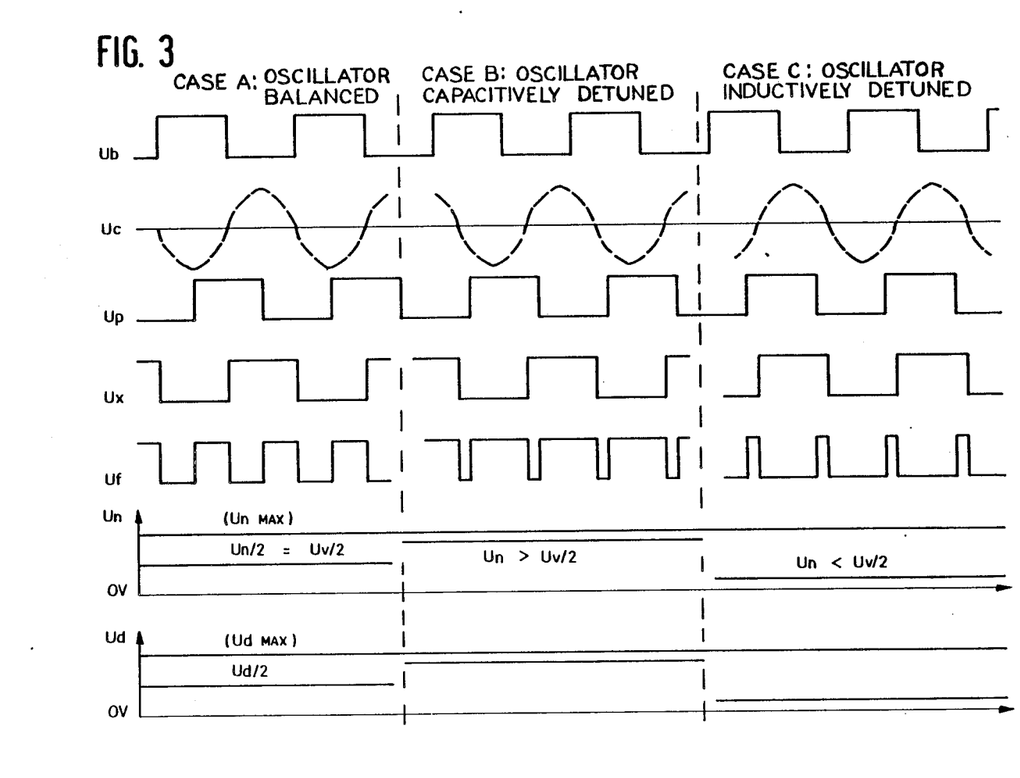
FIG. 3 is a collection of signal diagrams of electronic signals appearing in the present circuit.

Referring to FIG. 2, a fundamental structure of the control circuit is shown wherein the control circuit makes use of the physical property of the resonant circuit so that the circuits S1 and S2 selectively function as a real resistance at the respective desired resonance. In this case, the phase relation of the voltages between the collector and base of the driver transistor T, shown in FIG. 2, is exactly 180 degrees As soon as detuning of the circuit occurs, the condition that the voltage Uc differs from the voltage Ub by 180 degrees as shown in FIG. 3 is no longer established The phase relation of the circuit is taken with the voltage Uc. An over-driven MOS-Transistor TM, shown in FIG. 2, effects a level matching at a logic module U1 which is an exclusive-OR gate, operating at a low voltage The exclusive-OR gate is equivalent to a phase locked loop (PLL). A voltage Ux is compared therein with a voltage Up which is already present in the circuit and is derived from an oscillator, Q2 or Q3 in FIG. 1 as shown in FIG. 2 at the bottom thereof. The reference signal Up, for example Q2 of FIG. 1, is required for a channel and is acquired from the respective other channel, for example Q3 in FIG. 1, wherewith coherent signal curves are used for control. It is, thus, guaranteed that both resonant circuits maintain the same frequency given a constant phase shift.

Figure 4:
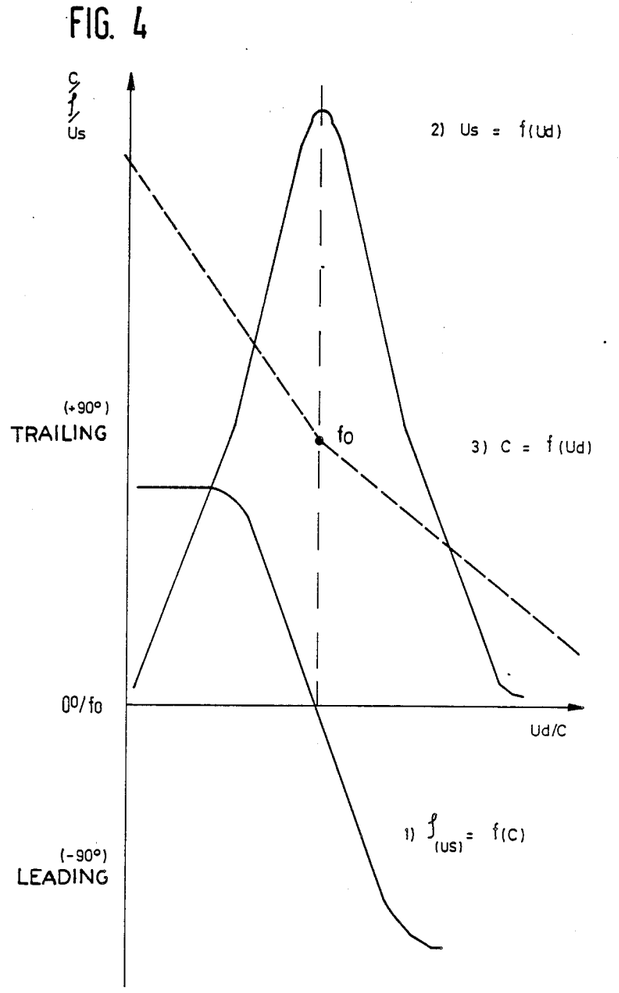
FIG. 4 is a graph showing the curve characteristic of the capacitor diodes.

A symmetrical pulse-duty factor Uf, as shown in FIG. 3, Case A, is established only given a balanced circuit and effects that the voltage Un=Uv/2 which is valid for integration elements R3 and C3 of FIG. 2. This is fed to a following comparator OP1 which compares Un to Uv/2. The comparator OP1 has its gain set so that matching of the control voltage Ud to the large signal behavior of the circuit is established. When the voltage Ux=Ub+/−180 degrees applies, then Un=Uv/2. The circuit then operates in the resonant point as shown in the graph of FIG. 4. The detuning and inequality of Ux unequal to Ub +/−180 degrees, as shown in Case B and Case C in FIG. 3, leads to Un being unequal to Uv/2 so that the circuit is retuned via voltage Ud.

The operation at the resonant behavior of the circuit occurs with the voltage dependent capacitor diodes KD11 and KD12, as shown in FIG. 2, via the control voltage Ud. Contrary to the tuning procedure in the filters, the diodes in this case are displaced through their characteristic range C=f (Ud), as shown in FIG. 4, as a consequence of their arrangement in the circuit. This possibility results from the large signal behavior of the resonant circuit that is required in order to allow an optimally high current to flow in the transmission coil L1 of FIG. 2 in order to be able to thus transform adequate energy into the microunit. Capacitors C11 and C12 function as voltage dividers so that the admissible blocking voltage of the series connected capacitor diodes KD11 and KD12 of FIG. 2 is not excluded.

Capacitor diodes having a curved characteristic for the function C=f (Ud), which is shown as curve 3 in FIG. 4, that could lead to distortions in the output signal. These distortions become all the more pronounced the further characteristic is modulated. For this reason, two capacitor diodes KD11 and KD12 of FIG. 2 are connected antiparallel in the circuit in terms of alternating current so that distortions of the resonant circuit cancel.

A controller shown in FIG. 2 is set forth with redundantly constructed circuits S1, T1 and S2, T2 as in FIG. 1. In other words, the control circuit of FIG. 12 is used at two places in the apparatus of FIG. 1. This provides the advantages that parameter changes are levelled, environmental influences are levelled, a 90 degree phase shift between circuits S1 and S2 required for phase modulation is monitored and held, and dissipated power in the circuit is limited to a minimum.

The circuit operates as follows: the capacitive part in the resonant circuit is assumed to have increased as a result of an assumed influence, for example, component tolerances or the operation of different microunits. The natural resonant frequency in the individual circuit comprising a coil and a capacitor drops in this case. Since, however, a fixed frequency is prescribed from the outside by the driver, the phase and thus the amplitude vary as well, as shown in FIG. 4. Compared to the voltage Up, the voltage Ux will trail by more than a 90 degrees phase difference as in Case B of FIG. 3. The mean value of the signal Uf (Un) rises. The control voltage Ud rises as a result of the comparison to Uv/2 where Uv is the supply voltage. When the voltage Ud rises, the regulating capacitance likewise falls and opposes the actual detuning of the circuit as shown in FIG. 4.

The same consideration, merely having opposite control behavior, is presented as Case C in FIG. 3 of inductive detuning.

The control circuit shown in FIG. 2 contains an additional function which is necessary since the circuit S2 of FIG. 1 experiences a phase change of 180 degrees with data to be transmitted to the microunit ME due to the exclusive OR gate 5.

These phase changes dare not lead to a modification of the control voltage Un since the circuit would then be detuned. The wiring of the stage T2 and S2 is identical to that of the first stage T1 and S1 (FIG. 1) with one exception. As seen in FIG. 2, the second stage T2 and S2 is driven by a phase-shiftable signal TM2. The reference phase for the comparison in the exclusive OR gate U1 is acquired from the signal Q2. Just like the phase-shiftable signal TM2, the signal Q2 is also inverted via an exclusive OR gate U2 in order to hold the control voltage constant in case of a data transmission. Minute, particularly short duration, disturbances during the switching have no influence since a time constant $T=R_3C_3$ is selected to be adequately high.

MAGNETIC STRIP COMPATIBILITY

Given use of a chip card as the microunit having a magnetic strip, the magnetic coating on the magnetic strip does not undergo any electromagnetic influencing. This property is attributed to the magnetic flux having a frequency f greater than 1 Megahertz flowing perpendicularly through the card. Due to the inertia and direction of the magnetic flux, the magnetic particles of the magnetic strip have no opportunity to change their position.

DATA TRANSMISSION

As initially mentioned, the two resonant circuits S1 and S2 operate with a phase difference of plus or minus 90 degrees. In the quiescent condition during which no data transmission is occurring, the first resonant circuit S1 always operates leading by 90 degrees relative to the second resonant circuit S2. Given data transmission to the microunit ME, the second resonant circuit S2 is switched by 180 degrees so that it subsequently leads the first resonant circuit S1 by 90 degrees. This operation is evaluated by the microunit.

The transmission of data directed from the microunit ME to the microstation MS occurs on the basis of an elevated power consumption on the part of the microunit. A voltage fade or drop can be detected via the internal resistance of the source in the microstation MS; this procedure is disclosed in German Patent No. P34 47 560.5 and corresponding U.S. Pat. No. 4,697,183, incorporated herein by reference.

ADDITUDINAL VARIANCE

Figure 6:
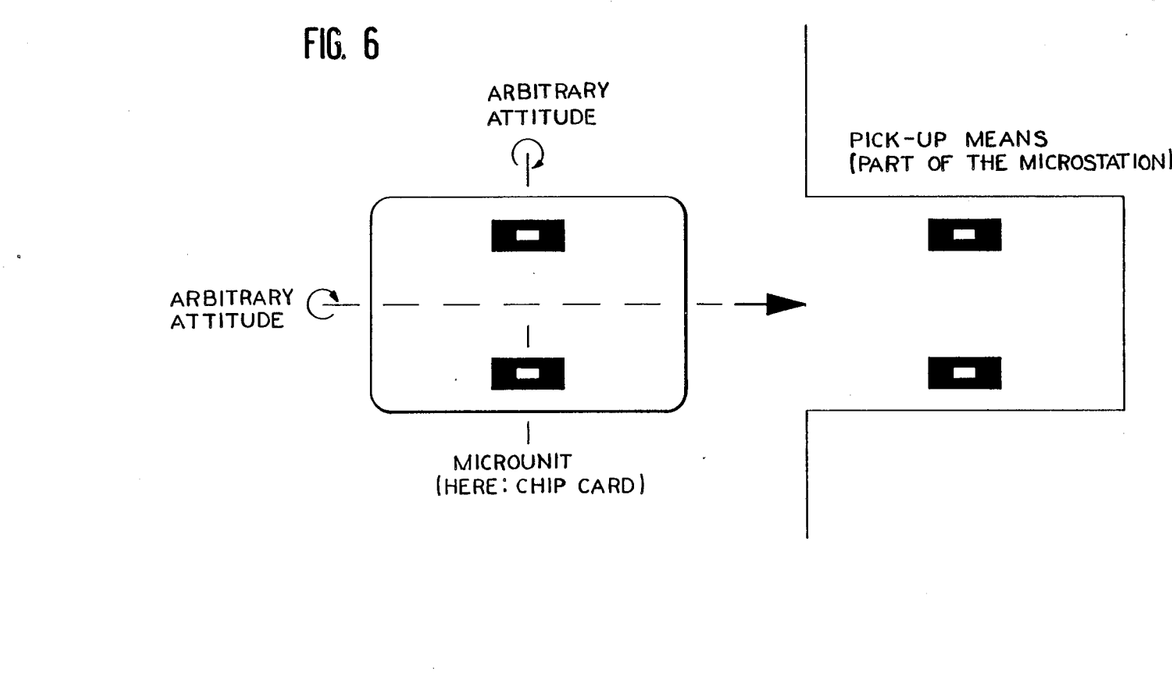
FIG. 6 is a schematic representation of the chip card for insertion into the card reader.

The function of the system is not dependent on the attitude of the microunit in the receptacle means. To this end, the two required coils of the microunit and the microstation in the chip card system are attached as shown in FIG. 6, see for example German Utility Model Application No. G 87 16 548.1. As a result thereof, the two coils of the microunit are guaranteed to lie opposite the two coils of the microstation regardless of how the microunit is turned before introduction into the receptacle means of the microstation. This always guarantees the operation of the unit and simplifies the handling of the system.

CLOCK ACQUISITION

An arithmetic unit, microcomputer, etc. can be accommodated on the microunit ME. The required processing clock is acquired directly from the frequency of the energy transmission or is acquired therefrom in divided fashion, see FIG. 7. Signals U3 and U4 acquire a digital signal from the sinusoidal analog voltage of the receiver coils. A separate oscillator is not required for the microunit ME, this contributes to a substantial simplification of the microunit ME. The basic prerequisite for the faultless operation of an arithmetic unit in the microunit ME is that the processing clock signal is available symmetrically and without irregularities. Since the microunit ME is supposed to work in an arbitrary inserted attitude in the microstation MS, it must be seen to that the clock is taken from the respectively non-modulated coil, see FIG. 6.

As can be seen from FIG. 1, a phase shift will always ensue via the coil in the second resonant circuit S2. Given this and the further basic prerequisite that the coil in the first resonant circuit S1 always leads the coil S2 by 90 degrees without aid of modulation, a recognition in arbitrary operating attitudes can ensue on the part of the microunit ME. To this end, the circuit is constructed in the microunit according to FIG. 7a.

In Case 1 and Case 2 shown in FIG. 7c is shown the different signal curves in the different operating attitudes of the system. In this regard see also FIG. 6. Case 1 shows that the signal U3 leads in comparison to the signal U4 so that the phase modulation ensues later at signal U4 and the clock signal acquisition ensues from the signal U3. In Case 2, the signal U4 leads in comparison to the signal U3 so that the phase modulation ensues later at the signal U3 and the clock signal acquisition ensues from the signal U4.

Figure 5:
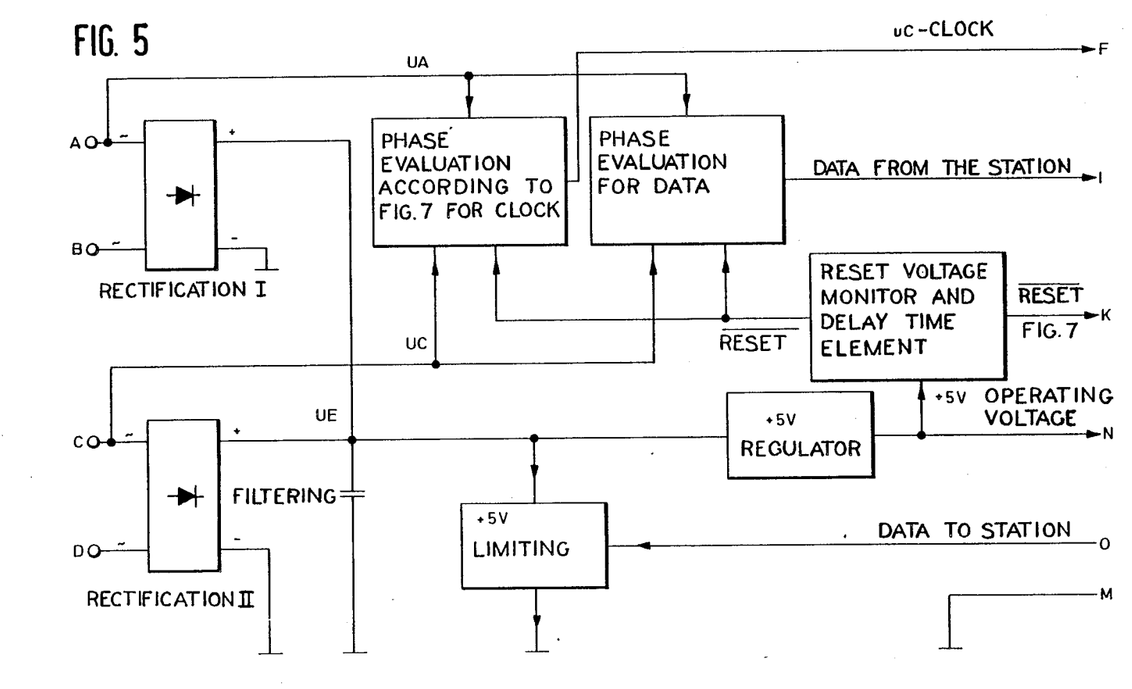
FIG. 5 is a functional block diagram of a circuit of the present invention.
Figure 7:
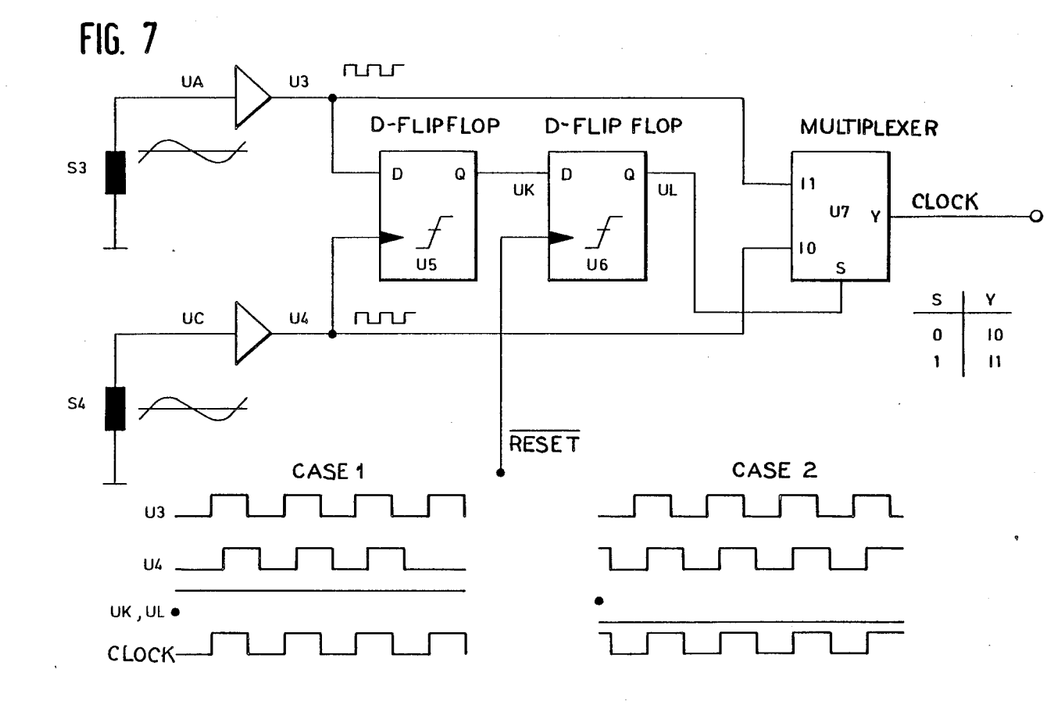
FIG. 7 is a circuit block diagram of a further portion of the circuitry on the chip card including signal diagrams of signals appearing in the circuit.

At its output, a flip-flop U5 shown in FIG. 7 recognizes a logical 1 for Case 1 and a logical 0 for Case 2. A positive reset edge follows at a flip-flop U6 somewhat time-delayed when the operating voltage of the microunit is built up and a delay time of a few microseconds has expired. Also refer to FIG. 5 in this regard.

This event always occurs only once at the beginning of operations when data is not yet being transmitted. The signal UL is adjacent to the control input of a multiplexer U7. In Case 1, the signal UL is 1 and channel I1 of the multiplexer U7 is connected through whereas the channel I0 of the multiplexer U7 is connected through for Case 2 where the signal UL equals 0.

These conditions continue to exist for the entire operating duration.

The level and basic condition of a data line DR of FIG. 7 is determined based upon the principal of clock allocation, with the difference that only a level fixing of the data signal ensues for this purpose and no multiplexer is required.

Thus, an invention is disclosed which is directed to an electronic control for two resonant circuits that serves the purpose of transmitting energy onto a mobile part. The resonant circuits are driven such that their oscillations have a prescribed phase shift relative to one another. For transmission of data onto the mobile part, moreover, a phase shift is superimposed on the transmitted signal at one resonant circuit. On the basis of the phase relation of the signals relative to one another, the mobile part can identify which resonant circuit is transmitting the data. The oscillation of the resonant circuit that is transmitting new data via the phase shift is used for the formation of the clock signal on the part of the mobile part.

Although other modifications and changes may be suggested by those skilled in the art, it is the intention of the inventors to embody within the patent warranted hereon all changes and modifications as reasonably and properly come within the scope of their contribution to the art.

I claim:

1. An apparatus for non-contacting signal and energy transmission between a substantially immobile part as a microstation and a mobile part as a microunit, the microstation having an oscillator operable to produce to an oscillation and having means for dividing the oscillation into two separate oscillations, means for forcing a phase shift on a first of the two separate oscillations relative to a second of said two separate oscillations depending upon a data stream, the phase shifted oscillation being supplied to the mobile part via a first coil pair and the other oscillation being supplied to the mobile part via a second coil pair and the power transmission ensuing via the same coil pairs with the assistance of the two oscillations, the mobile part having a phase comparator to which the transmitted oscillations are Supplied, the phase comparator acquiring the data from the data stream with reference to the phase shift and the data transmission from the mobile part to the immobile part ensuing on the basis of simultaneous load modification at both coils of the mobile part so that it is assured that documentation of the load variation is possible at one of the two coils of the microstation even given an interchanged allocation of the coil pairs, the improvement comprising: a first resonant circuit including a first inductance, a first capacitance, and a first capacitive diode, said first resonant circuit being resonant stabilized in a phase shifted fashion and having a voltage tap, a first transistor through which said first resonant circuit is driven by two coherent oscillations of fixed phase shift, said first transistor being connected in series with said first resonant circuit so that said resonant circuit acts as a real ohmic resistance resulting in a phase shift of exactly 180 degrees between an oscillation generating signal applied at a base of said first transistor and a signal at said voltage tap of said first resonant circuit when said first resonant circuit is in resonance and deviating from said 180 degree phase shift when said first resonant circuit is not in resonance; a second resonant circuit having a second inductance, a second capacitance, and a second capacitive diode, said second resonant circuit being resonant stabilized in phase-shifted fashion; a second transistor connected in series with said second resonant circuit; logic elements connected to convert deviations from said 180 degrees phase shift into a series of pulses having a pulse-duty factor dependent on phase shift; an R-C combination connected at an output of said logic elements to integrate said pulse-duty factor and produce a voltage value; an operational amplifier connected to compare said voltage value to a standard value, an output of said operational amplifier connected to drive said first capacitive diodes to stabilize said first resonant circuit to a supply frequency; a coherent phase-shifted part available as an oscillation generating signal being supplied to said second inductance of said second circuit; said second resonant circuit being stabilized to the same frequency as said first resonant circuit so that both frequency stabilized oscillations have a defined phase shift relative to one another, the frequency stabilized oscillations being available frequency stabilized and phase shifted via said first and second inductances of the immobile part to allow recognition and evaluation of the phase shift and guaranteeing a time defined standardized BAUD rate of the data stream on the basis of the frequency stability.

* * * * *